United States Patent [19]

Fayfield

[11] Patent Number: 5,254,846
[45] Date of Patent: Oct. 19, 1993

[54] ANALOG PHOTOSENSOR OPERATING ON THE POWER FROM A STANDARD 4-20 MA INSTRUMENTATION CURRENT LOOP

[75] Inventor: Robert W. Fayfield, Shorewood, Minn.

[73] Assignee: Banner Engineering Corporation, Minneapolis, Minn.

[21] Appl. No.: 840,301

[22] Filed: Feb. 24, 1992

Related U.S. Application Data

[63] Continuation-in-part of Ser. No. 532,029, Jun. 1, 1990, abandoned.

[51] Int. Cl.$^5$ ............................................. G01J 1/32
[52] U.S. Cl. ...................................... 250/205; 250/221
[58] Field of Search ............... 250/205, 221, 222.1, 250/201.4; 356/4; 315/149, 150, 151

[56] References Cited

U.S. PATENT DOCUMENTS

| | | | |
|---|---|---|---|
| 3,542,479 | 11/1970 | Sibalis | 356/202 |
| 4,040,740 | 8/1977 | Handtmann et al. | 356/4 |
| 4,313,655 | 2/1982 | Hell et al. | 354/25 |
| 4,356,393 | 10/1982 | Fayfield | 250/214 R |
| 4,598,198 | 7/1986 | Fayfield | 250/205 |
| 4,656,353 | 4/1987 | Thompson | 250/227.14 |
| 4,727,290 | 2/1988 | Smith et al. | 250/205 |
| 4,742,574 | 5/1988 | Smith et al. | 250/227.16 |
| 4,757,190 | 7/1988 | Ando et al. | 250/205 |
| 4,789,778 | 12/1988 | Layh | 250/221 |
| 4,886,961 | 12/1989 | Kimura et al. | 250/205 |

Primary Examiner—David C. Nelms
Assistant Examiner—John R. Lee
Attorney, Agent, or Firm—Merchant, Gould, Smith, Edell, Welter & Schmidt

[57] ABSTRACT

A photoelectric sensor interfaces and operates directly on the power available from a standard current loop without requiring an independent power supply. The sensor includes an emitter and receiver for measuring a parameter such as the distance between a target and the sensor. The intensity of light received by the receiver controls, as an inverse function, the amount of current drawn by the emitter. As the target becomes distant and the intensity of received light decreases, the sensor directs more current to the emitter, which also serves to enhance the sensor's range. As the target becomes closer to the sensor, the intensity of received light increases and the sensor directs less current to the emitter because less current is required to produce a signal of sufficient strength for the receiver to detect. With less current directed to the emitter, sufficient current from the current loop is still available to operate the remaining circuitry in the sensor.

5 Claims, 2 Drawing Sheets

ANALOG PHOTOSENSOR OPERATING ON THE POWER FROM A STANDARD 4-20 MA INSTRUMENTATION CURRENT LOOP

This is a continuation-in-part of Pat. application Ser. No. 07/532,029, filed Jun. 1, 1990, now abandoned.

FIELD OF THE INVENTION

This invention pertains to the field of photoelectric sensors, and in particular, to photoelectric sensors that contain both an emitter and receiver and where the current drawn by the device and supplied to the emitter varies as an analog function of the receiver signal, which allows a photoelectric sensor to operate directly from a standard current loop without an independent power supply.

BACKGROUND OF THE INVENTION

It is frequently useful in photoelectric sensing to obtain an analog voltage or current signal that is a function of signal strength which, in turn, is a function of distance, reflectivity, and other factors. One application for such a signal is in the area of process control, where it is desirable to alter the speed of a motor which controls an unwind roll in response to the nearness of a loop of web material to the photoelectric sensor. Another application is in edge-guiding a web, where the analog signal represents the position of the web edge, and the signal is then used to control the edge-guide motors to keep the web centered. A third application is in controlling a robot or automatic guided vehicle, so that it slows down and eventually stops as it approaches a solid surface, such as a wall. Another typical application, which may become increasingly popular with the trend toward the use of programmable controllers, is to monitor the strength of the analog signal and generate a warning indication when the analog signal becomes marginal, but before the photoelectric sensor is rendered inoperative by dirt, dust, moisture, misalignment, or other factors.

The design and use of analog photoelectric sensors is well known, as characterized by the analog series of Multi-Beam sensors manufactured by Banner Engineering Corp., the Assignee of the present invention, and by similar analog products of other manufacturers. These analog photoelectric sensors are typically powered by low voltage DC (e.g., 12-28 v DC) or by AC line voltage (e.g., 120 v AC). Such sensors have an output which is generally a DC voltage (e.g., 0-10 v DC) or a DC current (e.g., 4-20 milliamps). Such an output requires a third wire (a DC signal line) in the case of DC sensors, or a third and fourth wire (a DC signal line and a DC ground) in the case of AC sensors.

The 4-20 milliamp current loop on which these sensor outputs operate has been widely accepted as the standard in the instrumentation and control industry. The use of a current for the variable parameter minimizes the effects of any transmission line resistance. Furthermore, using 4 milliamps as the lower limit means that the monitoring circuit may detect when the line is broken by sensing zero current.

The independent power supply for the sensors must be able to supply whatever current is required to run the sensor circuitry plus the analog output current. A typical requirement is 20 milliamps for the sensor and another 20 milliamps for the maximum output current. The separate power supply used by these sensors provides the current necessary to produce a light or, in other applications, an acoustic signal with sufficient range.

The third wire in these three-wire systems sources or sinks a variable current by "burning" or absorbing the appropriate amount of current to introduce on the current loop a current proportional to the measured parameter. The measured parameter may be, for example, the distance between a target and the sensor. The instrumentation circuitry coupled to the sensor receives the variable current and can thus produce control signals based upon the measured characteristic.

The independent power supply required by these three-wire sensors represents a significant cost when compared with the cost of a typical sensor. The power supply may actually cost as much as the sensor itself.

Therefore, there is a need in the industry for a sensor that operates directly from the power of a standard current loop so that an independent power supply is not required. In particular, there is a need for a two-wire photoelectric sensor that operates directly from an industry standard 4-20 milliamp current loop.

SUMMARY OF THE INVENTION

The present invention provides a significant improvement over prior sensors by operating directly on the power available from a standard current loop. Therefore, the present sensor invention does not require an independent power supply.

The present invention, in the preferred embodiment, is a photoelectric sensor that interfaces and operates directly on the power from an industry standard 4-20 milliamp current loop. The sensor produces a variable current on the 4-20 milliamp current loop which is proportional to a measured parameter, and the instrumentation circuitry coupled to the sensor senses the variable current. The measured parameter may be, for example, the distance between the sensor and a target. The sensor generates a current proportional to this distance by transmitting a photoelectric (light) signal to the target and sensing the amplitude of the corresponding reflected return signal. The sensor uses the amplitude of the return signal to control the variable current produced on the current loop.

When the target is located distant from the sensor, a substantial amount of current is required to launch a photoelectric signal of sufficient strength so that the sensor may detect a return signal. At this extreme the sensor typically uses nearly all of the available 20 milliamps from the 4-20 milliamp current loop to produce the photoelectric signal. The instrumentation circuitry detects the large current draw, which is an indication to the instrumentation circuitry that the target is distant from the sensor.

At the other extreme, when the target is located close to the sensor, the sensor must indicate to the instrumentation circuitry that the target is close by drawing a small amount of current. This small amount of current would not ordinarily be enough to launch a photoelectric signal of sufficient strength to produce a detectable return signal. However, when the target is close to the sensor, a photoelectric signal of less strength is required as compared to when the target is distant. When the target is close to the sensor, only a small amount of current, typically 4 milliamps at this extreme, is required to launch a photoelectric signal of sufficient strength. Therefore, since the sensor needs a reduced amount of current at this extreme, the sensor may operate directly from the current loop without requiring an independent power supply.

The present invention takes the novel approach of controlling the power of the transmitted photoelectric signal by the strength of the returned signal so that the sensor may operate at both extremes, when the target is close and distant from the sensor, directly from the power of a standard 4-20 milliamp current loop without requiring an independent power supply. The sensor varies the power of the transmitted photoelectric signal as an inverse function of the strength of the return signal. For example, when the return signal strength is high, indicating that the target is close, the transmitted power is low. Conversely, when the return signal strength is low, indicating that the target is distant, the transmitted power is high.

DETAILED DESCRIPTION OF THE PREFERRED EMBODIMENT

In the following detailed description of the preferred embodiment, reference is made to the accompanying drawings in which is shown, by way of illustration, a preferred embodiment in which the invention may be practiced. It is to be understood that other embodiments may be used without departing from the scope of the present invention.

Figure 1:
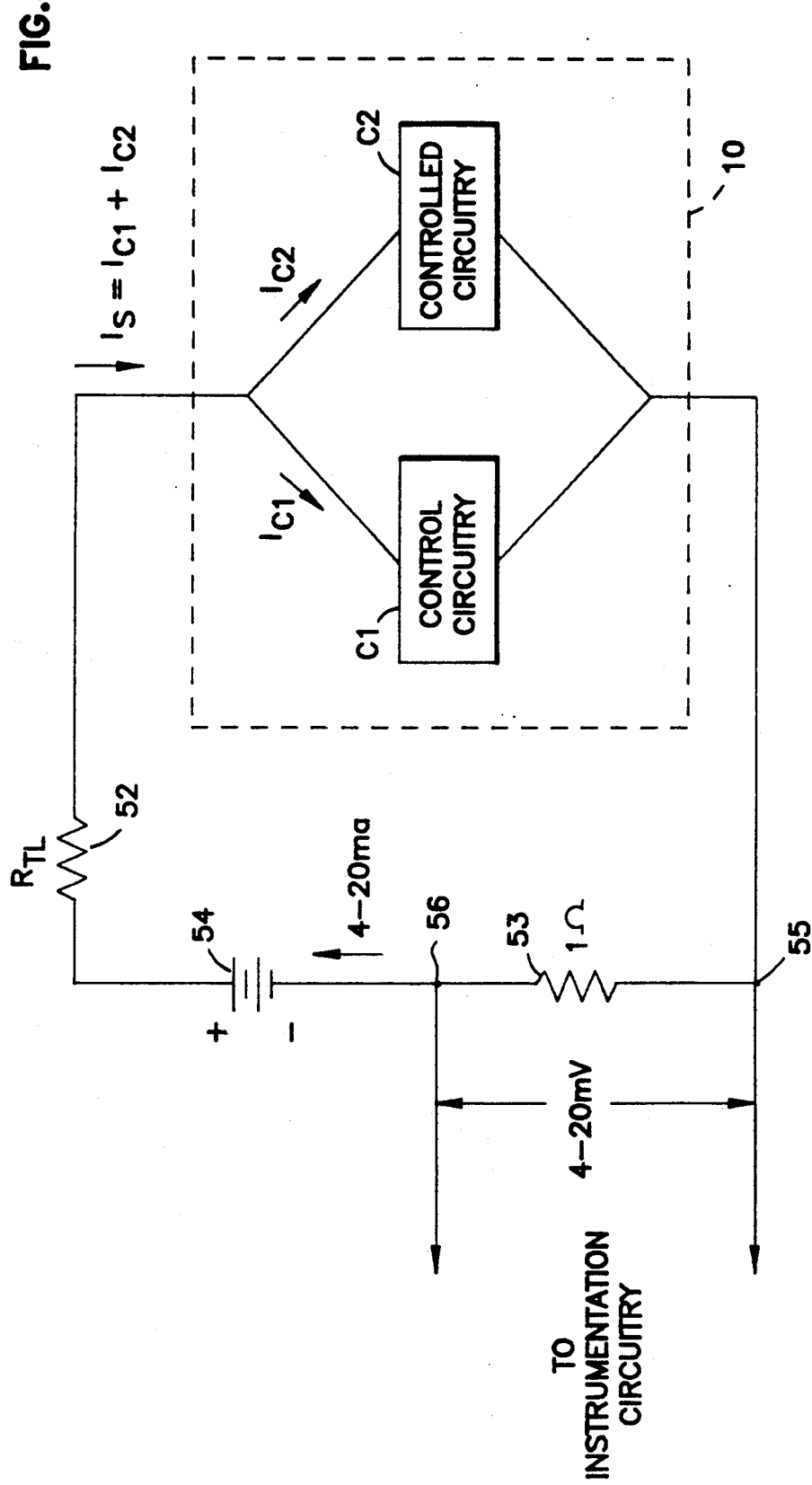
FIG. 1 is a schematic block diagram of the interface between a standard 4-20 milliamp current loop and an analog photoelectric sensor circuit incorporating the present invention.

FIG. 1 is a block diagram of a sensor incorporating the present invention and the interface between the sensor and instrumentation circuitry coupled to the sensor. FIG. 1 illustrates the conceptual operation of the present invention. The preferred sensor uses a standard current loop to both generate a variable current and receive sufficient power to operate. The standard current loop is preferably an instrumentation industry standard 4-20 milliamp current loop. Voltage source 54, capable of generating 4-20 milliamps and connected in series with resistor 53 and transmission line resistance 52, represents a standard 4-20 milliamp current loop. Sensor 10 is coupled in series with the current loop.

Instrumentation circuitry (not shown) may be coupled in parallel across resistor 53, for example, in order to detect the amount of current drawn by sensor 10. If resistor 53 has a value of 1 Ohm, the instrumentation circuitry may detect a variable 4-20 millivolts between nodes 55 and 56. The value of the voltage detected by the instrumentation circuitry depends upon the amount of current drawn by sensor 10. The amount of current drawn by sensor 10 depends upon the distance between the sensor and a target from which light, generated by the sensor, is reflected and received by sensor 10. Therefore, the instrumentation circuitry detects a voltage, or possibly a current, which is proportional to the distance between the target and the sensor.

Sensor 10 may be represented by control circuitry C1 and controlled circuitry C2. The total current drawn by sensor 10 from the current loop is: $I_s = I_{C1} + I_{C2}$. Current $I_{C1}$ is relatively constant and represents overhead current required to operate various components within sensor 10. In the preferred embodiment of a standard 4-20 milliamp current loop, $I_{C1}$ is around 2 milliamps. Current $I_{C2}$ is variable and represents the "burn" current used to operate a phototransmitter plus any additional emitter current generated by a receiver. The value of $I_{C2}$ will depend upon the distance between the target and sensor. Therefore, the total current draw $I_s$ of the sensor, which the instrumentation circuitry detects, will be proportional to the distance between the target and sensor 10.

Current $I_{C2}$ drives the phototransmitter to transmit a light signal to the target. The phototransmitter in the preferred embodiment is an emitter LED. Ordinarily a substantial amount of current $I_{C2}$ is required to generate a light signal which, when reflected by the target, is of sufficient strength to be detected by a receiver sensor 10. This is particularly true when the target is located distant from the sensor. When the target is distant, sensor 10 may draw the 20 milliamp maximum current available from the current loop. This allows 2 milliamps of current for $I_{C1}$ and 18 milliamps of current for $I_{C2}$, which is a sufficient amount to generate a light signal.

When the target is located close to the sensor, the sensor may only, for example, draw the minimum 4 milliamps available from the current loop to indicate to the instrumentation circuitry the relative position of the target. The 4 milliamp draw provides the required 2 milliamps for $I_{C1}$, but only 2 milliamps are then available for $I_{C2}$. Ordinarily these 2 milliamps would not be sufficient for $I_{C2}$. However, when the target is close, the light signal may be of a lower intensity than when the target is distant, since energy (light) reflected from the target is attenuated by the square of the distance from the sensor. The return signal will consequently be much less attenuated when the target is located close to the sensor in comparison to when the target is distant. Therefore, an average of 2 milliamps for $I_{C2}$ will be sufficient to drive an emitter LED to produce a light signal of sufficient strength so that the receiver may detect the reflected return signal. Sensor 10 may thus operate directly from the standard 4-20 milliamp current loop without requiring an independent power supply, even at the 4 milliamp extreme when the target is close to the sensor.

To accomplish the above result current, $I_{C2}$ is controlled by the strength of the received signal such that the magnitude of $I_{C2}$ varies as an inverse function of the magnitude of the received signal. When the target is distant, the received signal magnitude is small and, consequently, the sensor delivers a large amount of current $I_{C2}$ to the emitter LED, which may be 18 milliamps. At the other extreme, when the target is in close proximity to the sensor, the received signal is large, and the sensor delivers a small amount of current to the emitter LED, which may be 2 milliamps.

Figure 2:
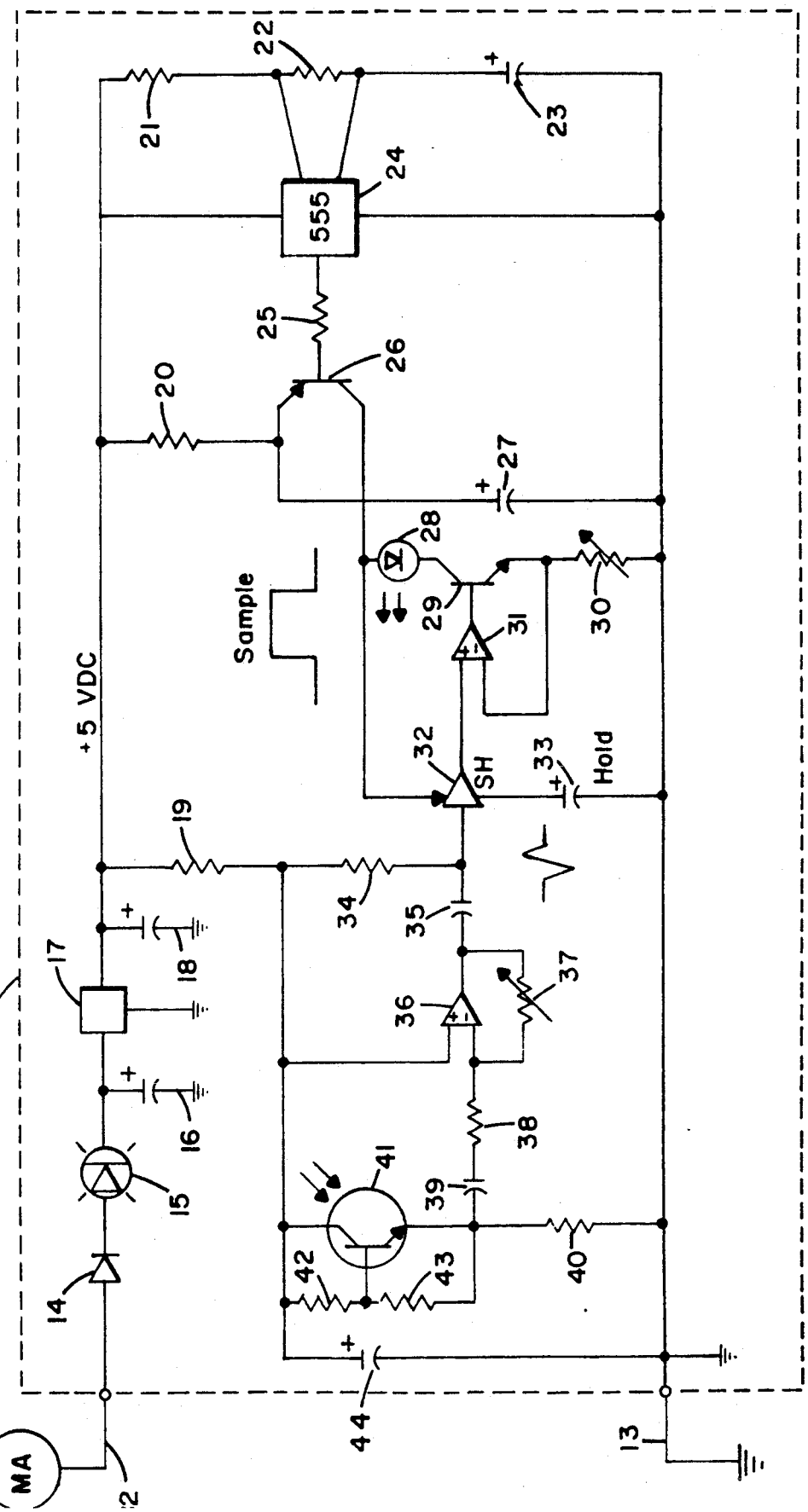
FIG. 2 is a schematic electrical diagram of an analog photoelectric sensor circuit incorporating the present invention.

FIG. 2 shows the preferred embodiment of a sensor incorporating the present invention. Box 10 contains the entire circuit. Line 12 supplies power to the circuit 10. Line 13 provides the ground for circuit 10. Current monitoring device 11 would typically be the current sensing electronics of a programmable controller but could just as well be a simple milliammeter. A high voltage diode, labelled in the drawing as 14, protects the circuit against a reverse polarity hookup.

Element 15 is an indicator LED whose brightness will increase proportionally to the current draw of the sensor. An indicator such as 15 is a convenient way to see that the sensor is operating correctly. LED 15 also provides some indication of the changing current of the sensor. It could be replaced by the alignment indicating device disclosed in U.S. Pat. No. 4,356,393 by Fayfield and assigned to Banner Engineering Corp.

The element labelled as 17 is a standard three terminal voltage regulator. Elements 16, 18, 27 and 44 are filter capacitors used with various filters of the circuit which are explained below. Resistor 19 is a decoupling resistor used in conjunction with capacitor 44.

The element labelled as 24 is a standard CMOS "555" type oscillator operating at a frequency of several kilohertz. Such an oscillator will typically have a pulse width of 10 microseconds. Each time the output of oscillator 24 goes low, transistor 26 conducts and a pulse is sent from filter capacitor 27 to the emitter LED 28. The magnitude of the current in the pulse is controlled by emitter follower transistor 29 and resistor 30. Resistor 25 establishes the drive current for the base of transistor 26. Resistor 21 and capacitor 23 determine the period of the oscillator 24. Resistor 22 and capacitor 23 determine the pulse width of oscillator 24.

The emitted light from 28 hits a target and a portion is reflected back to the receiving phototransistor 41. Bias resistors 42 and 43 are used to set the operating point of phototransistor 41. Bias resistor 40 determines the quiescent current in phototransistor 41 when no light pulses are being received. The small positive pulse (a few millivolts) from phototransistor 41 is amplified by a conventional AC coupled operational amplifier 36. Feedback resistors 37 and 38 are used to set the gain of amplifier 36. The voltage gain is equal to the value of resistor 37 divided by the value of resistor 38. Capacitor 39 is a high pass filter for amplifier 36.

A sample and hold amplifier 32 captures the negative going amplified pulse from amplifier 36 using the emitter pulse signal of transistor 26 as the sample control. This helps to minimize noise and interference since only the signal that occurs during the emitter pulse is captured. Element 32 could also be a simple negative peak detector. Resistor 34 and capacitor 35 form a high pass filter that lets only very short pulses through to the sample and hold amplified 32 and blocks low frequency signals such as those from 60 hertz light sources. Capacitor 33 holds the charge for the sample and hold amplifier 32. Amplifier 31 and transistor 29 form an emitter follower. The lower the DC voltage into amplifier 31, the less the magnitude of the current pulses through emitter LED 28.

Thus, with no received signal, resistor 30 is adjusted for a total sensor current draw of 20 milliamps. The emitter LED 28 uses an average of approximately 18 milliamps. Since energy is stored in filter capacitor 27, the net effect is a DC current flowing into the sensor even though the DC current is being used in pulses through the emitter LED 28. Similarly, when the target is quite close to the sensor and a current signal from photoresistor 41 is at a maximum, resistor 37 is adjusted for a 4 milliamp draw of the sensor.

By multiplying the values of resistor 20 and filter capacitor 27 together, the time constant of the sensor is determined. If the values for filter capacitor 27 and resistor 20 are too small, the current draw of the sensor will become pulses rather than a DC signal. If the values of filter capacitor 27 and resistor 20 are too large, the response time of the sample and hold amplifier 32 will be unacceptably long. A target time constant of oscillator 24 would typically be some value between 10 and 100 times the period of the oscillator 24.

Thus, the present invention is an analog photoelectric sensor that supplies a variable 2-18 milliamps average current to the emitter LED 28 as a function of the strength of the received signal. Conventional thinking would suggest that this analog photoelectric sensor would be an impractical product since the performance would be limited to the operation at the lowest supply current draw, which is 4 milliamps. At this low current, only a limited range would be possible due to the need for high pulse currents in the emitter LED 28.

The present invention, however, reverses the conventional idea that the emitter LED 28 pulse should be directly proportional to received signal strength. In the present invention, the average current supplied to the emitter LED 28 varies inversely as a function of received signal strength. Accordingly, when there is no signal, as for example when the target is a long way away from the sensor, the emitter LED 28 may use 18 milliamps average. When the target is very close, resulting in a minimal signal, the emitter LED 28 may use only 2 milliamps average.

The present invention is essentially a negative feedback closed loop, in which the strength of the received signal inversely controls the power of the emitter LED current pulses. When there is no signal (the "dark" condition), the circuit is trimmed at resistor 30 to draw 20 milliamps. Assuming that only 2 milliamps are needed by the rest of the circuit, there are 18 milliamps available for the emitter LED 28. Assuming an emitter duty cycle of 5%, this results in 360 milliamp pulses to the LED 28, which is sufficient for most long range sensing.

As the target comes into view, or draws closer to the sensor, more light is reflected and a signal begins to appear. Because of the negative feedback of this signal to the LED drive circuit, the sensor circuitry reduces the amount of current to the emitter LED 28. This results in less current flowing into the sensor circuit, said current being monitored by the remote computer or instrumentation circuitry.

Ultimately, the target gets so close to the sensor that little current is required in the emitter LED 28 to maintain a signal from the receiver. Thus, the current draw approaches the 2 milliamps that is needed for the rest of the circuit. By trimming the amplifier gain at resistor 37, it is possible to set the distance of the target from the sensor such that the intensity of the received light causes the sensor to draw a total current of 4 milliamps. A current draw of 4 milliamps is a typical lower limit for instrumentation circuitry. Thus, the sensor generates a 4 to 20 milliamp current draw as the target moves from close proximity to a far distance.

As explained above, resistors 30 and 37 are shown as having a variable resistance. The purpose of having variable or adjustable resistors is to set the current draw of the sensor, and this may be accomplished either during or after construction of the invention. Therefore, a practical embodiment may include resistors which may be set at the time of manufacture of the sensor, since the current draw of the sensor does not generally need to be adjusted in the field. This could be accomplished, for example, by variable resistors or by inserting a resistor of the appropriate resistance into the sensor. Alternatively, resistors 30 and 37 may be variable resistors such as potentiometers, which would allow field adjustment of the sensor current draw.

Although a specific schematic has been illustrated and described for the preferred embodiment of the present invention set forth herein, it will be appreciated by those of ordinary skill in the art that any circuit which is calculated to achieve the same purpose may be substituted for the one shown. For example, even though the emitter has been shown as an emitter LED, the present invention may also utilize emitters generating other types of signals, such as sonic waves or radar. Also, the present invention is shown, the preferred embodiment, as interfacing a standard 4-20 milliamp current loop. The present invention may operate with current loops having different limits. Thus, the present invention disclosed herein may be implemented through the use of different components. This application is intended to cover any adaptations or variations of the present invention. Therefore, it is manifestly intended that this invention be limited only by the claims and equivalents thereof.

What is claimed is:

1. Photoelectric measuring and indicating apparatus, comprising:
    light emitting means, coupled to a current source, for transmitting light having an intensity which varies with a current supplied thereto;
    light responsive means for receiving light and producing a signal indicative of the intensity of the received light;
    control means for controlling a current from said current source supplied to said light emitting means as a function of the intensity signal produced by said light responsive means, so that the current supplied to said light emitting means is at a maximum magnitude when the light received by said light responsive means is at a minimum magnitude, and the total current supplied to said light emitting means is at a minimum magnitude when the light received by said light responsive means is at a maximum magnitude, and the total current drawn by the apparatus is an inverse analog function of the intensity of the received light;
    said control means comprising a timing circuit operable in response to the voltage of the intensity signal such that said timing circuit draws a DC current from said current source having a magnitude that varies inversely with the magnitude of the voltage of the intensity signal; and
    said control means further comprising means, coupled to said timing circuit, for selecting a first resistance to draw a DC current through said apparatus having a maximum magnitude when the intensity signal has a minimum magnitude, and for selecting a second resistance to draw a DC current through said apparatus having a minimum magnitude when the intensity signal has a maximum magnitude.

2. A sensor operating on the power from a 4-20 milliamp instrumentation current loop, comprising:
    first and second output terminals coupled to said instrumentation current loop;
    emitter means for transmitting a signal toward a target to be sensed, said emitter means comprising means for varying the intensity of said transmitted signal as a function of the magnitude of an input current supplied to said emitter means;
    receiver means for receiving at least a portion of said transmitted signal; and
    control means, coupled to said first and second terminals, said emitter means, and said receiver means, for providing power to said emitter means, comprising:
        first means for drawing a first current from said instrumentation current loop to provide power for the operation of said control means; and
        second means for drawing a second current from said instrumentation current loop, for varying said second current as an inverse function of the intensity of said received signal, and for supplying said second current to said emitter means as said input current,
    whereby the amount of current drawn by said sensor provides an indication on said instrumentation current loop of a measured parameter between said emitter and said receiver.

3. The sensor of claim 2 wherein said emitter means comprises means for transmitting an electromagnetic signal.

4. The sensor of claim 2 wherein said emitter means comprises means for transmitting a sonic signal.

5. The sensor of claim 2 wherein said control means comprises:
    a first amplifier having an input coupled to said receiver means and an output;
    a sample-and-hold circuit having an input coupled to said output of said first amplifier, a control terminal, and an output;
    a second amplifier having an input coupled to said output of said sample-and-hold circuit and an output coupled to said emitter means; and
    an oscillator coupled to said emitter means and said control terminal of said sample-and-hold circuit.

* * * * *